United States Patent
Gventer et al.

(10) Patent No.: US 6,924,950 B2
(45) Date of Patent: Aug. 2, 2005

(54) APPARATUS FOR VIEWING A DISPLAY OF A PORTABLE COMMUNICATION DEVICE

(75) Inventors: Brian Gventer, Forth Worth, TX (US); Andreas Morr, North Richland Hills, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/706,314

(22) Filed: Nov. 12, 2003

(65) Prior Publication Data

US 2005/0099701 A1 May 12, 2005

(51) Int. Cl.[7] .............................................. G02B 27/02
(52) U.S. Cl. ...................................... 359/802; 359/822
(58) Field of Search .............................. 359/802–805, 359/822

(56) References Cited

U.S. PATENT DOCUMENTS 6,389,268 B1 * 5/2002 Snyder ....................... 455/90.1
6,476,984 B1 * 11/2002 Ringdahl ..................... 359/803

* cited by examiner

Primary Examiner—Hung Xuan Dang
Assistant Examiner—Joseph Martinez
(74) Attorney, Agent, or Firm—Arjun Krishnan

(57) ABSTRACT

Apparatus, and an associated method, for facilitating viewing of a display indicia displayed upon a user display of a portable communication device, such as a cellular mobile station. An optical lens that exhibits a selected magnification level is positioned to overlay the user display. A mounting arm engages with the optical lens and with the portable communication device to affix the optical lens so that when the user of the communication device views the user display, the display indicia displayed thereon is magnified by the optical lens.

7 Claims, 4 Drawing Sheets

APPARATUS FOR VIEWING A DISPLAY OF A PORTABLE COMMUNICATION DEVICE

The present invention relates generally to a manner by which to facilitate viewing of display indicia upon a user display of a portable communication device, such as a portable radio communication station. More particularly, the present invention relates to apparatus, and an associated method, by which to magnify the display indicia displayed upon the user display. A user of the portable communication device is able better to perceive the display indicia.

An optical lens is selectably positioned to overlay the user display. The optical lens is affixed in position by a mounting arm that connects the optical lens with the portable communication device. The optical lens is of dimensions to permit the user to view the display indicia through the optical lens, but also not to hinder the user's ability to actuate actuation keys that also form part of the personal communication device. User interactive communication services and applications, such as interactive gaming applications provided to, and through, a cellular mobile station, require that a user be able both to view display indicia as well as, sometimes concurrently, also to enter user inputs. User perception of the display indicia is facilitated through use of the magnification provided by the optical lens while continuing to permit ready user access to user actuation keys of the mobile station.

BACKGROUND OF THE INVENTION

A communication system provides for the effectuation of a communication service between communication stations positioned at spaced-apart locations. Data that is to be communicated to effectuate the communication service is originated at, or otherwise provided to, a first of the communication stations. The data is communicated therefrom by way of a communication channel to another communication station.

Various types of communication systems have been developed to provide for the effectuation of different types of communication services. And, various of such communication systems have been deployed, available for use to communicate data therethrough to effectuate communication services between a set of communication stations.

New types of communication systems have been developed and deployed as advancements in technology permit. And, with continuing technological advancements, additional types of communication systems shall further likely be developed and deployed that shall provide improved, as well as new, communication services to be effectuated.

A radio communication system is a type of communication system. A radio communication system, as its name denotes, makes use of radio channels defined upon radio links extending between communication stations to form the communication channels upon which data is communicated. Because radio channels are used upon which to communicate data, the need for wireline connections to interconnect the communication stations and upon which to form communication channels is obviated.

Because wireline, i.e., fixed, connections are not required to interconnect the communication stations between which data is to be communicated, communications are effectuable through use of a radio communication system between communication stations positioned at locations at which the formation of wireline connections would be inconvenient or impractical. For instance, when one, or more, of the communication stations is permitted mobility, use of wireline connections extending to the mobile communication station is oftentimes impractical. Accordingly, implementation of a communication system as a mobile communication system generally requires that the communication system form a radio communication system. Use of a radio communication system also provides for various other advantages. For instance, the costs required initially to install and deploy a radio communication system are generally less than the costs required to install and deploy the corresponding wireline communication system.

A cellular radio communication system is an exemplary type of radio communication system. A cellular communication system is a multi-user system that permits significant numbers of users concurrently to communicate telephonically therethrough when positioned in an area encompassed by the communication system. Users communicate through the use of mobile stations that include radio transceiver circuitry capable both of generating and receiving communication data. Many mobile stations are of small dimensions, permitting portability of the mobile stations. Mobile stations generally include a user interface having both a user input keypad, or other actuator, and a user display. Actuation keys of the actuation keyboard are actuated by the user of the mobile station, e.g., to initiate a call connection by way of the cellular communication system. The actuation keys are variously utilized for additional purposes, such as pursuant to an ongoing communication session, by which to enter commands that are used in an aspect of data communication pursuant to the communication session. An interactive gaming application is exemplary of a communication service in which a user of a mobile station actuates selected actuation keys of the actuation keypad during a communication session.

The user display includes a screen at which display indicia is displayed. The display indicia includes, for instance, communication data that is communicated to the mobile station as well as, also, data that is locally-generated for display thereon. Display indicia is displayed upon the user display, for instance, pursuant to an interactive gaming application or pursuant to a multi-media communication service.

Advancements in integrated circuit, and other, technologies have permitted reduction in the physical dimensions of electrical circuits, such as the electrical circuits of which the radio transceiver circuitry of a mobile station are formed. Many mobile stations used in a cellular radio communication system are, for instance, of physical dimensions permitting their carriage by a user in a user's shirt pocket.

When a mobile station is of these small dimensions, the user display of the mobile station correspondingly must be of small dimensions. Many times, the size of the user display is limited to be of lengthwise and widthwise dimensions of only several centimeters. Display indicia displayed upon the user display is more difficult to view when the user display is of such small dimensions. When a user of a mobile station is near-sighted or far-sighted, the display indicia is even more difficult to view.

If a manner could be provided by which better to permit a user to perceive the display indicia displayed upon the user display, improved acceptance of the device would be possible.

It is in light of this background information related to the viewing of display indicia upon a user display of a portable communication device that the significant improvements of the present invention have evolved.

SUMMARY OF THE INVENTION

The present invention, accordingly, advantageously provides apparatus, and an associated method, by which to facilitate viewing of display indicia upon a user display of a portable communication device, such as a portable radio communication station operable in a cellular communication system.

Through operation of an embodiment of the present invention, a manner is provided by which to magnify the display indicia displayed upon the user display.

Improved perception of the display indicia is provided to a user of the portable device through positioning of an optical lens to overlay the user display. A mounting arm engages with both the optical lens and the portable communication device. When suitably engaged, the optical lens is affixed in position above the user display. The optical lens is selected to be of dimensions to permit the user to view the display indicia through the optical lens and also not to impede the access of a user to actuation keys positioned at the portable communication device.

Because the optical lens is of dimensions that permit the viewing of display indicia upon the user display while also permitting unimpeded access by the user to the actuation keys of the device, the user is readily able concurrently to view the display indicia in magnified form and to actuate the actuation keys.

User interactive communication services and applications, such as interactive gaming applications, require ready access of a user to actuation keys in order for the user quickly to actuate selected ones of the actuation keys. And, display of display indicia generated pursuant to the interactive gaming application must be readily viewable by the user. By positioning the optical lens to overlay the user display, the user is able to perceive better the display indicia displayed thereon during performance of the interactive gaming application.

In one aspect of the present invention, the optical lens exhibits a magnification factor that increases the apparent image size of display indicia displayed on the user display. The magnification of the size of the display indicia is determined by the characteristics of the optical lens. The magnification factor is, e.g., of a magnification level that doubles (2x) or triples (3x) the display indicia. By increasing the apparent size of the display indicia, the user's perception of the indicia is improved. And, at such magnification levels, substantially the entire screen of the user display is viewable, in magnifiable form, by the user of the communication device. Display indicia displayed upon a user display measuring only several centimeters in length and several centimeters in width are magnified so that the display indicia displayed thereon during effectuation of a communication service appears to be larger than the small heights and widths that are permitted of display upon the display screen of the user display.

In another aspect of the present invention, a mounting arm is provided that affixes the optical lens in position above the user display so that a user of the portable communication device is permitted to view the display indicia displayed upon the user display in magnified form. The mounting arm is removably engageable with both the optical lens and the portable communication device. When the portable communication device is stored, not used, or magnification of the display indicia displayable upon the user display is not desired, the mounting arm is disconnected out of engagement with the portable communication device. A storage bag or container in which the portable communication device is stored is also used, for instance, to store the mounting arm and optical lens when not in use. When, conversely, magnification of the display indicia displayable upon the user display is desired, the user positions the mounting arm to engage with both the optical lens and with the housing of the portable communication device.

An end portion of the mounting arm includes a clamp member that is clampingly engageable with the optical lens to affix the optical lens in clamping engagement therewith. The mounting arm includes an elongated mounting arm piece that extends upwardly along a side portion of the portable communication device. The elongated mounting arm piece is affixed at the side portion of the portable communication device in engaged affixation thereby. And, the mounting arm further includes a mounting arm extension piece that is hingingly connected to the elongated mounting arm extension piece.

The extension piece is pivotable about the hinge such that, when the elongated mounting arm piece is affixed to the side housing surface of the portable device, the mounting arm extension piece is positionable to abut against a backface surface of the portable device. The mounting arm extension piece is further affixed in position to the communication device thereby.

In one implementation, mated connectors, such as a spring detent assembly is used to affix the mounting arm extension piece to the back surface of the communication device. And, in one implementation, the elongated mounting arm piece hookingly engages with a hooking surface formed at the portable communication device. Once engaged in affixation to the portable communication device, the optical lens, clampingly engaged with the clamping member of the mounting arm, is pivoted into position above the user display. The user is then able to view display indicia displayed upon the user display.

In these and other aspects, therefore, apparatus, and an associated method, is provided for a portable radio communication station. The portable radio communication station has a user display that selectably displays display indicia of an initial display size. The user display is positioned at a face surface of the radio communication station. Viewing by a user of a display displayed on the user display is facilitated. An optical lens is selectably positionable above the user display of the radio communication station. The optical lens is of a dimension at least to cover at least a portion of the user display when positioned thereabove. The optical lens exhibits a magnification level that magnifies the display indicia of the initial display size to be of a magnified display size when viewed by the user through the optical lens. A mounting arm is engageable with both the optical lens and the radio communication station. The mounting arm mounts the optical lens in position above the user display.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
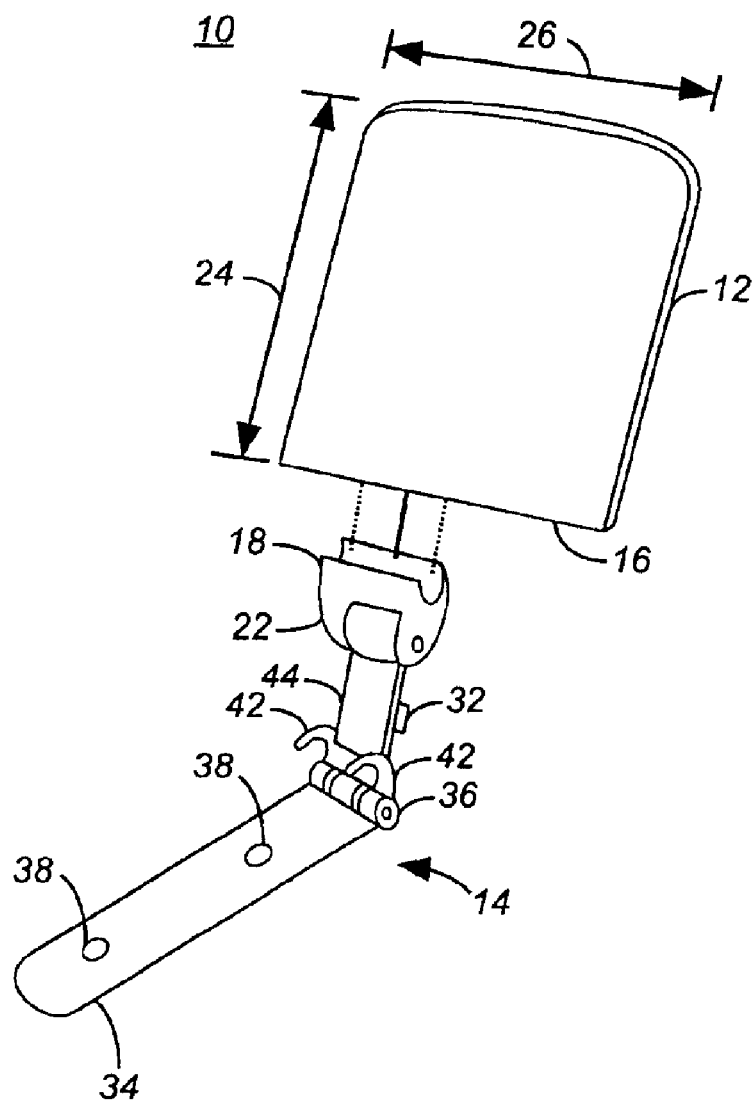
FIG. 1 illustrates an exploded view of the apparatus of an embodiment of the present invention that, when affixed to an appropriate portable communication device, such as a cellular radio telephone, facilitates viewing of display indicia displayed upon a user display of the portable communication device.

Referring first to FIG. 1, the apparatus, shown generally at 10, of an embodiment of the present invention includes an optical lens 12 and a mounting arm 14. The lens 12 and mounting arm 14 are releasably engageable with one another. Here, while the lens and mounting arm are shown in exploded view, the elements are connected theretogether during their operation to facilitate a viewing of display indicia displayed upon a user display of a portable communication device.

The separate elements of the apparatus are connected together by positioning a bottom 16 of the optical lens to abut with a clamp brace 18 of a clamp member 22. The clamp member 22 is positioned at an end of the mounting arm and forms a portion of the mounting arm. The clamp brace 18 is of a configuration permitting the reception of the end 16 of the optical lens thereat and to clampingly engage the optical lens when received thereat. In one implementation, the clamp member is formed of a substantially rigid material permitting of limited plastic deformation when the end of the optical lens is positioned at the clamp brace. The deformation causes compressive forces to be exerted upon the optical lens that form the clamping forces to clamp the optical lens together with the mounting arm.

The optical lens is formed of a transparent material and is configured to exhibit a magnification factor, e.g., a 2× or 3× magnification factor. The optical lens is of a selected heightwise dimension, indicated by the arrow 24 and a selected width-wise dimension, indicated by the segment 26. The depth-wise dimension of the lens is dependent upon the material that is used to form the lens and the magnification factor that the lens is to exhibit.

The mounting arm is of a multiple-piece construction, here formed of a first, telescoping mounting arm piece 32 and a mounting arm piece extension 34. The elongated piece 32 and the extension piece 34 are hingedly coupled together by way of a hinge member 36. An end portion of the elongated mounting arm piece 32, opposed to the end at which the clamp member 22 is positioned is coupled to a first hinge arm of the hinge member. And, an end part of mounting arm extension is coupled to, or forms, a second hinge arm of the hinge member. Hinged movement about a hinge pin of the hinge member permits relative rotation of the respective pieces 32 and 34 of the mounting arm. The relative rotational positions of the pieces 32 and 34 include the as-illustrated perpendicular orientation of the pieces relative to one another.

The mounting arm extension piece includes spaced-apart apertures 38 of dimensions permitting seating therein of spring-biased bearings (not shown) that are used to engage the mounting arm extension piece with a portion of a portable communication device to which the apparatus is to be engaged.

Additionally, the first hinge side of the hinge member includes inwardly-facing hook members 42 at opposing sides of the hinge piece. The portable communication device includes corresponding hook member receptors for receiving the hook members hookingly to engage the hook members, and the mounting aim thereby, in position at the portable communication device.

In the exemplary implementation, the elongated telescoping mounting arm piece 32 is formed of two sections, a first section 44 and a second section 46. The second section is seated in the first section and is capable of relative axial translation, i.e., telescoping movement, selectably to alter the length of the piece 32 in an axial direction.

Figure 2:
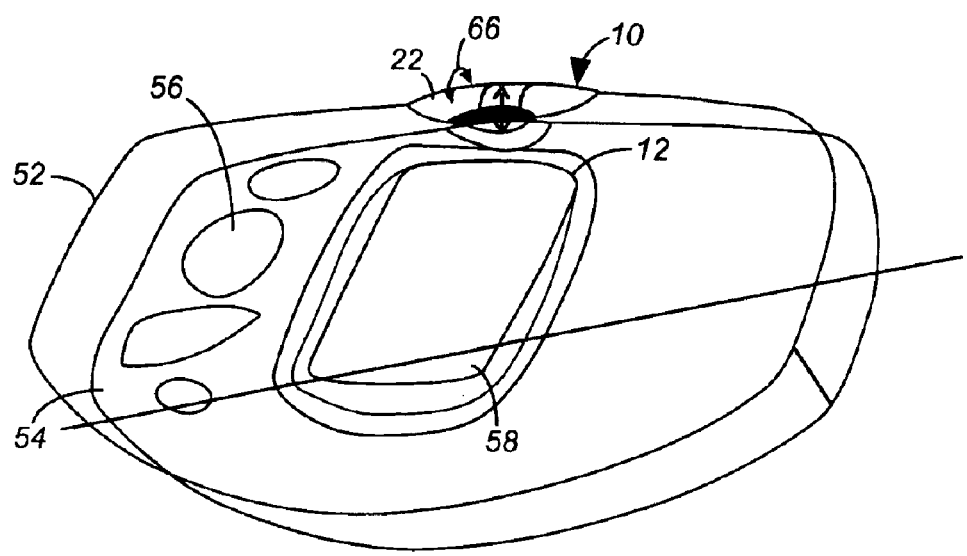
FIG. 2 illustrates a partial perspective, partial functional, diagram of the apparatus shown in FIG. 1 engaged with a portable communication device and positioned to facilitate viewing of display indicia displayed upon a user display of the portable communication device.

FIG. 2 illustrates the apparatus 10 positioned to engage with an exemplary portable communication device 52, here a cellular mobile station. The mobile station includes radio transceiver circuitry (not shown) that is housed inside a housing that defines a top face surface 54 at which actuation keys 56 and a user display 58. In this construction of mobile station, actuation keys 56 are positioned at both sides of the user display. The actuation keys are actuable by a user of the mobile station to enter input commands and other data. Depending upon the communication service that is effectuated during operation of the mobile station, the user might be required to actuate one or more of the actuation keys. For instance, when the communication service is associated with an interactive gaming application, the user of the to mobile station typically is required repeatedly to actuate the actuation keys of the mobile station during the interactive gaming.

At least in part, the actuation of the actuation keys by the user is made responsive to display indicia displayed upon the user display 58. Here, exemplary text 62 is displayed upon the user display. During effectuation of an interactive gaming application, for instance, successive types of display indicia are displayed upon the user display. The display indicia is formed both of textual matter as well as non-textual display indicia. Because the user display is of only several centimeters in lengthwise and widthwise dimensions, a user might have difficulty in reading, or otherwise comprehending, the display indicia displayed upon the user display.

Through positioning of the optical lens 12 above the user display at an appropriate height thereabove, the apparent image size of the display indicia is magnified at a magnification level corresponding to the magnification factor exhibited by the optical lens.

In the illustration of the figure, the optical lens is positioned proximate to, and above, the user display at a height-wise elevation above the display to position the optical lens best to magnify the display indicia displayed upon the user display. Through appropriate connection of the optical lens with the clamp member 22, to clampingly engage the optical lens, and engagement of the mounting arm to the housing of the mobile station, the optical lens is positionable at the desired position above the user display. In the exemplary implementation, rotational pivoting of the clamp in the directions indicated by the arrow 66 permits "flipping" movement of the optical lens into the desired position once the mounting arm is engaged with the housing of the mobile station. When a viewer views the user display through the optical lens, the display indicia displayed upon the user display is magnified, at a magnification factor corresponding to the magnification factor exhibited by the optical lens.

Figure 3:
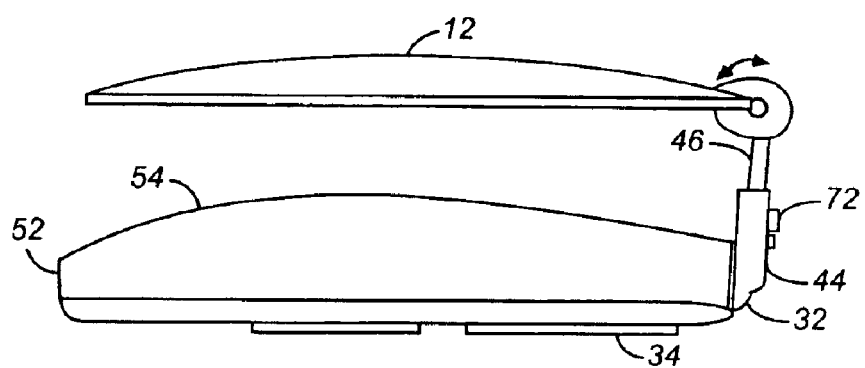
FIG. 3 illustrates a side elevational view of the apparatus together with the portable communication device, shown in FIG. 2.

FIG. 3 also illustrates the apparatus 10 positioned in engagement with the mobile station 52 and in which the optical lens 12 is positioned above the top face surface 54 of the mobile station to permit a user of the mobile station to view the user display (shown in FIG. 2) through the optical lens. The mounting arm, formed of the elongated telescoping mounting arm piece 32 and the mounting arm extension piece 34 is shown in affixed engagement with the housing of the mobile station. The sections 44 and 46 of the elongated telescoping mounting arm piece 32 are also illustrated in the figure. Here, the section 46 is telescoped, i.e., extended, to protrude out of the first section 44 to increase the elevation at which the optical lens is positioned above the top face surface of the mobile station. And, the clamp member is shown to be pivoted about a clamp member axis to position the optical lens, clampingly affixed thereto, to extend in a direction substantially perpendicular to the axial direction in which the mounting arm piece 32 extends and in a direction generally parallel to the direction in which the top face surface extends. In the exemplary implementation, a friction lock 72 is actuable by a user into either a locked or unlocked position, to permit translation, or to prevent translation, of the section of the telescoping mounting arm piece 32.

Figure 4:
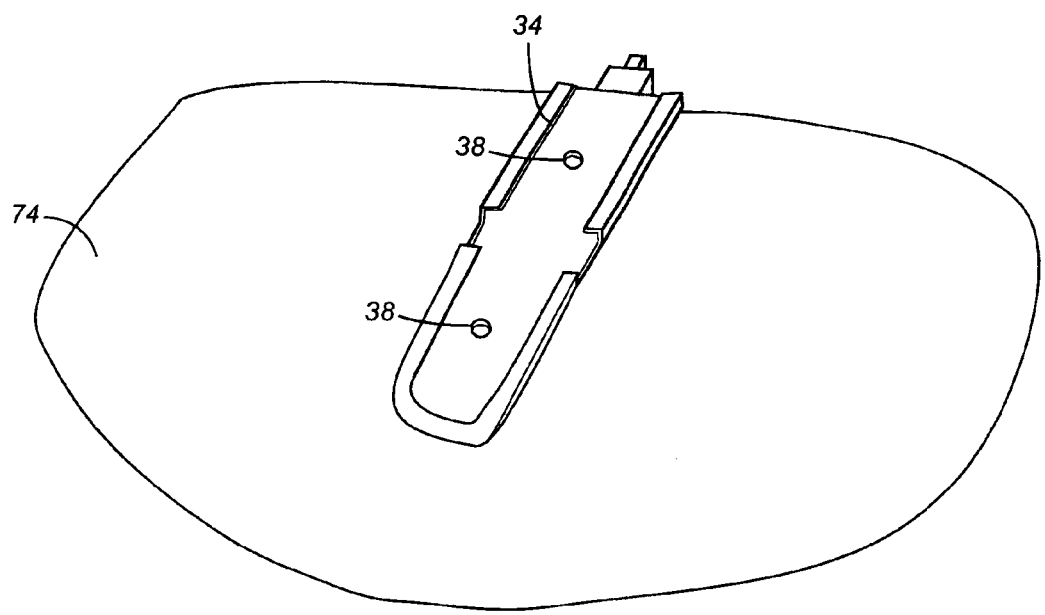
FIG. 4 illustrates a view taken from beneath the portable communication device.

FIG. 4 illustrates the engagement of the mounting arm extension piece 34 to a bottom face surface 74, i.e., back surface, of the mobile station. Here, the surface 74 includes a track formed therealong corresponding in dimensions to the dimensions of the mounting arm extension piece. Sliding translation of the mounting arm extension along the track positions the extension piece in position such that spring-actuated bearings are caused to be positioned at the detents 38 to affix the mounting arm extension in position thereat.

When not being used, the optical lens 12 is easily removable out of the clamp engagement with the mounting arm. And, the optical lens is stowed while the mounting arm remains in engagement with the mobile station. The optical lens is stored, for instance, in a storage case that also is used to store the mobile station when the mobile station is not in use. When the user of the mobile station desires again to utilize the optical lens, the optical lens is readily reattachable to the clamp member and pivoted into position above the user display. When desired, the mounting arm further is removed out of engagement with the mobile station and stored, also, for instance, at a storage container at which the mobile station is also stored when not in use. The mounting arm is removed out of engagement by unhooking the hook member of the mounting arm piece 32 out of its hooking engagement at the mobile station and by translating the mounting arm extension out of position at the bottom surface of the mobile station. Movement is facilitated, for instance, by depressing the spring bearings positioned in the detents 38 or by applying a translation force that has a component to cause corresponding movement of the spring bearings out of the detents.

Figure 5:
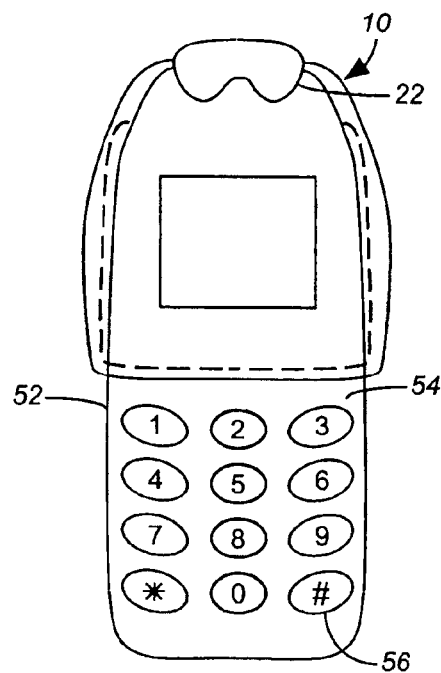
FIG. 5 illustrates a partial perspective, partial functional, view of the apparatus engaged with another portable communication device.

FIG. 5 illustrates the apparatus 10 used in conjunction with a mobile station 52 of another construction. The mobile station again defines a top face surface 54 at which actuation keys 56 and a user display are positioned. Again, the optical lens is affixed to a clamp member 22 of the mounting arm to position the optical lens to overlay the user display. The optical lens is of dimensions completely to cover the user display so that the display indicia displayed upon the user display is magnified when a user views the display through the optical lens. Again, the dimensions of the optical lens are selected such that the actuation keys 56 are readily accessible by a user so that actuation of selected ones of the actuation keys is readily effectuated.

Figure 6:
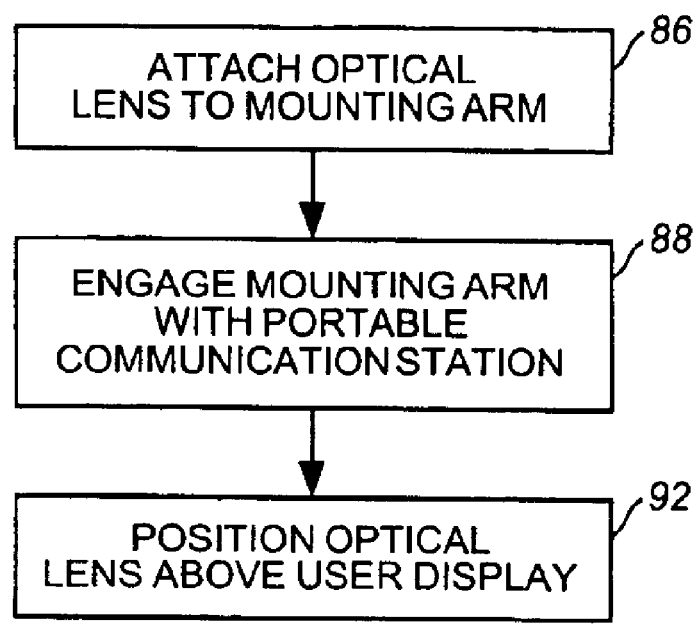
FIG. 6 illustrates a method flow diagram listing the method of operation of the method of an embodiment of the present invention.

FIG. 6 illustrates a method flow diagram, shown generally at 84, representative of the method of operation of an embodiment of the present invention. The method facilitates viewing by a user of a display displayed upon a user display of a radio communication station.

First, and as indicated by the block 86, an optical lens is attached to a mounting arm. The optical lens exhibits a magnification level that magnifies the display indicia, initially of an initial display size, to be of a magnified display size when viewed by the user through the optical lens.

Then, and as indicated by the block 88, the mounting arm is engaged with the portable radio communication station. And, thereafter, and as indicated by the block 92, the optical lens is positioned above the user display to permit viewing of the user display through the optical lens.

Thereby, the user's perception of the display indicia displayed at the user display is improved. Display indicia of sizes permitting its display at the user display is magnified, and appears to the user of the communication station, to be of the dimensions according to the magnification level exhibited by the optical lens.

The previous descriptions are of preferred examples for implementing the invention, and the scope of the invention should not necessarily be limited by this description. The scope of the present invention is defined by the following claims.

What is claimed is:

1. An apparatus for viewing a display in a portable radio communication station having a user display that selectably displays display indicia of an initial display size, the user display positioned at a face surface of the portable radio communication station comprising:

an optical lens selectably positionable above the user display of the portable radio communication station, said optical lens of a dimension at least to cover at least a portion of the user display when positioned thereabove, said optical lens exhibiting a magnification level that magnifies the display indicia of the initial display size to be of a magnified display size when viewed by the user through said optical lens;

a mounting arm engageable with both said optical lens and the portable radio communication station, said mounting arm for mounting said optical lens in position above the user display;

wherein said mounting arm comprises a first elongated mounting arm piece extending in an axial direction and a telescoping piece positionable in the first elongated mounting arm and permitted selected telescoping movement in the axial direction relative to the first elongated mounting arm piece, relative positioning of the telescoping piece determinative of heightwise positioning of said optical lens;

wherein the portable radio communication station further defines a back surface, the back surface opposed to the face surface;

wherein said mounting arm comprises a first elongated mounting arm piece and a mounting arm extension piece, said mounting arm extension piece positionable along the back surface of the portable radio communication station;

wherein the portable radio communication station further defines a side surface extending between the face surface and the back surface;

wherein said first elongated mounting arm piece is positionable to extend along the side surface of the portable radio communication station;

wherein said mounting arm further comprises a hinge piece, said hinge piece connected, at a first side thereof, to said first elongated mounting arm piece and, at a second side thereof, to said mounting arm extension;

wherein said mounting arm extension piece further comprises an affixation mating part, said affixation mating part for engaging with the portable radio communication station to engage together said mounting arm with the portable radio communication station.

2. An apparatus for viewing a display in a portable radio communication station having a user display that selectable displays display indicia of an initial display size, the user display positioned at a face surface of the radio portable communication station comprising:

an optical lens selectable positionable above the user display of the portable radio communication station, said optical lens of a dimension at least to cover at least a portion of the user display when positioned thereabove, said optical lens exhibiting a magnification level that magnifies the display indicia of the initial display size to be of a magnified display size when viewed by the user through said optical lens;

a mounting arm engageable with both said optical lens and the portable radio communication station, said mounting arm for mounting said optical lens in position above the user display; and wherein said mounting arm further comprises a clamping piece positioned at an end portion thereof, said clamping piece for engaging said optical lens in clamping engagement, thereby to support said optical lens in position therefrom.

3. The apparatus of claim 2 wherein said clamping piece is pivotally coupled at the end portion of said mounting arm, said clamping piece positioned at a selected radial orientation relative to said mounting arm.

4. The apparatus of claim 3 wherein said mounting arm extends in an axial direction and wherein the selected radial orientation in which said clamping piece is positioned extends in a direction substantially perpendicular to the axial direction in which said mounting arm extends.

5. The apparatus of claim 4 wherein, when said optical lens is engaged with said mounting arm and said mounting arm is engaged with the portable radio communication station, said optical lens is positionable to extend in a direction substantially parallel to a face surface of the radio communication station.

6. An apparatus for viewing a display in a portable radio communication station having a user display that selectably displays display indicia of an initial display size, the user display positioned at a face surface of the portable radio communication station comprising:

an optical lens selectably positionable above the user display of the portable radio communication station, said optical lens of a dimension at least to cover at least a portion of the user display when positioned thereabove, said optical lens exhibiting a magnification level that magnifies the display indicia of the initial display size to be of a magnified display size when viewed by the user through said optical lens;

a mounting arm engageable with both said optical lens and the portable radio communication station, said mounting arm for mounting said optical lens in position above the user display;

wherein the portable radio communication station further defines a back surface, the back surface opposed to the face surface;

wherein said mounting arm comprises a first elongated mounting arm piece and a mounting arm extension piece, said mounting arm extension piece positionable along the back surface of the portable radio communication station;

wherein the portable radio communication station further defines a side surface extending between the face surface and the back surface;

wherein said first elongated mounting arm piece is positionable to extend along the side surface of the portable radio communication station;

wherein said mounting arm further comprises a hinge piece, said hinge piece connected, at a first side thereof, to said first elongated mounting arm piece and, at a second side thereof, to said mounting arm extension; and wherein said mounting arm extension piece further comprises an affixation mating part, said affixation mating part for engaging with the portable radio communication station to engage together said mounting arm with the portable radio communication station.

7. An apparatus for viewing a display in a portable radio communication station having a user display that selectably displays display indicia of an initial display size, the user display positioned at a face surface of the portable radio communication station comprising:

an optical lens selectably positionable above the user display of the portable radio communication station, said optical lens of a dimension at least to cover at least a portion of the user display when positioned thereabove, said optical lens exhibiting a magnification level that magnifies the display indicia of the initial display size to be of a magnified display size when viewed by the user through said optical lens;

a mounting arm engageable with both said optical lens and the portable radio communication station, said mounting arm for mounting said optical lens in position above the user display;

wherein the portable radio communication station further defines a back surface, the back surface opposed to the surface;

wherein said mounting arm comprises a first elongated mounting arm piece and a mounting arm extension piece, said mounting arm extension piece positionable along the back surface of the portable radio communication station; and wherein the first elongated mounting arm piece further comprises a hooking latch, said hooking latch latchingly engageable with the portable radio communication station to engage said mounting arm together with the portable radio communication station.

* * * * *